United States Patent [19]
Brennan et al.

[11] 3,987,109
[45] Oct. 19, 1976

[54] POLYMERIZATION OF POLYFUNCTIONAL PHENOLS

[75] Inventors: John F. Brennan, Des Plaines; George R. Lester, Park Ridge, both of Ill.

[73] Assignee: Universal Oil Products Company, Des Plaines, Ill.

[22] Filed: Feb. 18, 1975

[21] Appl. No.: 550,394

Related U.S. Application Data

[63] Continuation-in-part of Ser. No. 319,094, Dec. 27, 1972, abandoned.

[52] U.S. Cl. .................... 260/613 R; 260/47 ET
[51] Int. Cl.² ......................................... C07C 41/00
[58] Field of Search ............ 260/613 R, 620, 47 ET

[56] References Cited

UNITED STATES PATENTS 3,679,704  7/1972  Lester et al. ..................... 260/340.3

FOREIGN PATENTS OR APPLICATIONS 708,676  4/1965  Canada ........................... 260/47 ET
959,283  5/1964  United Kingdom ............. 260/47 ET

*Primary Examiner*—Bernard Helfin
*Attorney, Agent, or Firm*—James R. Hoatson, Jr.; Raymond H. Nelson; William H. Page, II

[57] ABSTRACT

A polyfunctional phenol is polymerized utilizing a carrier catalyst comprising a palladium carboxylic acid salt in a carboxylic acid medium.

21 Claims, No Drawings

POLYMERIZATION OF POLYFUNCTIONAL PHENOLS

CROSS-REFERENCE TO RELATED APPLICATIONS

This is a continuation-in-part of our copending application Ser. No. 319,094, filed Dec. 27, 1972, now abandoned all the teachings of which are specifically incorporated by reference.

This invention relates to a process for preparing a phenylene ether polymer. More specifically, this invention relates to the polymerization of a polyfunctional phenol selected from the group consisting of a dihydroxy and trihydroxy benzene in the presence of a carrier catalyst comprising a palladium carboxylic acid salt in a medium comprising a carboxylic acid to prepare a polyphenylene ether polymer.

Prior art has shown these materials have been prepared by a number of methods such as the well-known Ullman synthesis. Briefly, this method involves treating an alkali metal salt of a phenol with an aryl halide or polyhalide in the presence of a catalyst such as copper at temperatures ranging between 200° C. and 300° C. for 0.5 hour to 10 hours, pouring the hot mixture into a solvent such as toluene or xylene, filtering the insoluble alkali metal halide, washing with aqueous caustic to remove excess phenol, and removing the solvent by distillation or evaporation to isolate the polyphenylene ether polymer or derivatives thereof. Other methods for the preparation of the polyphenylene ether polymers have shown a polymerization of a monofunctional phenol substituted with hydrogen, halogen, alkyl and alkoxy radicals containing from 1 to 3 carbon atoms, with lead dioxide or manganese dioxide utilized as a catalyst. It has now been discovered that polymers of a polyphenylene ether can be prepared by the polymerization of a dihydroxy or trihydroxy-substituted benzene in the presence of a carrier catalyst comprising a palladium carboxylic acid salt and a medium comprising a carboxylic acid.

The novel process permits the selection of a greater number of suitable starting materials thereby allowing the manufacture of a larger range of products while not inhibiting the percentage recovery of the resultant polyphenylene ether polymer. This novel polymerization process will give a more practical and useful preparation of the polyphenylene ether polymer.

Polyphenylene ether polymers are utilized in the chemical industry in organic synthesis, perfumery, preparation of various soaps and as a heat transfer medium. The lower molecular weight polyphenylene ether polymers are utilized as insecticides, fuel lubricant additives and plasticizers. Another use of a polyphenylene ether polymer is its use as a packing material in gas chromatography columns for analytical chemistry purposes. More specifically, the polyphenylene ether polymers possessing a molecular weight of from 804 atomic mass units to 20,000 atomic mass units may be utilized as a self-extinguishing thermoplastic compounds. The higher molecular weight polymers of this invention may be utilized as a chemical-resistant packaging material or a self-extinguishing electrical insultating material.

It is therefore an object of this invention to provide a polymerization process for the preparation of a polyphenylene ether polymer.

A further object of this invention is to provide a polymerization process for the preparation of a polyphenylene ether polymer utilizing certain carrier catalytic compositions of matter and reaction mediums to yield a more practical and more useful polymer from a greater variety of starting materials.

In one aspect an embodiment of this invention resides in a process for the preparation of a polyphenylene ether polymer which comprises polymerizing a polyfunctional phenol selected from the group consisting of dihydroxy and trihydroxy benzenes in the presence of a carrier catalyst comprising a palladium carboxylic acid salt in a medium comprising a carboxylic acid at polymerization conditions, and recovering the resultant polyphenylene ether polymer.

A specific embodiment of this invention resides in the preparation of a polyphenylene ether polymer which comprises polymerizing hydroquinone in the presence of palladium acetate and an acetic acid medium, and recovering the resultant polyphenylene ether polymer.

Another specific embodiment of this invention resides in the preparation of a polyphenylene ether polymer which comprises polymerizing resorcinol in the presence of palladium acetate, which is prepared in situ by the addition of palladium chloride and sodium acetate in an acetic acid medium.

Other objects and embodiments will be found in the following further detailed description of the present invention.

As hereinbefore set forth the present invention is concerned with a polymerization process for preparing a polyphenylene ether polymer by polymerizing a polyfunctional phenol selected from the group consisting of dihydroxy and trihydroxy benzenes in the presence of a carrier catalyst comprising a palladium carboxylic acid salt in a medium comprising a carboxylic acid. The polymerization reaction is effected under conditions which include a temperature at least as high as that of the reflux temperature of the carboxylic acid and preferably no greater than about the boiling point of the polyfunctional phenolic compound. In addition, another polymerization condition involves pressures, said pressures ranging from about 1 atmosphere up to about 100 atmospheres or more. If superatmospheric pressures are to be employed, said pressures are afforded by the introduction of a substantially inert gas such as nitrogen into the reaction zone, the particular pressure at which the polymerization is effected being that which is sufficient to maintain a major portion of the reactants in the liquid form.

Suitable starting materials which can be used to prepare a polyphenylene ether polymer have the general formula:

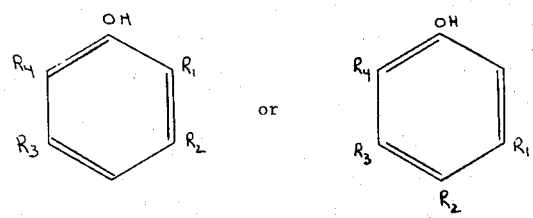

wherein $R_1$, $R_2$, $R_3$ and $R_4$ are selected from the group consisting of hydrogen, alkyl radical possessing between 1 to 3 carbon atoms, lower alkoxy radicals, hydroxy radicals or halogens, but where at least one but not more than two of the radicals comprising $R_1$, $R_2$, $R_3$ or $R_4$ is a hydroxy radical. Examples of suitable polyfunctional phenolic compounds which can be utilized as one of the starting materials in the polymerization process include, but are not limited to, catechol, 4-chlorocatechol, 3,5-dibromocatechol, 4-methylcatechol, 3,5-dimethylcatechol, 3-methyl-4-n-butylcatechol, 3-methoxycatechol, 3-methoxy-4-ethoxycatechol, resorcinol, 2-chlororesorcinol, 4,5,6-tribromoresorcinol, 2-methoxyresorcinol, 2-methoxy-5-ethoxyresorcinol, 2-methylresorcinol, 2-methyl-5-n-butylresorcinol, hydroquinone, 2-chlorohydroquinone, 2,3,5-trichlorohydroquinone, 2,5-dibromohydroquinone, 3-ethoxyhydroquinone, 2,3-dimethoxyhydroquinone, 2-methoxy-5-chlorohydroquinone, 2-methoxy-3-ethoxyhydroquinone, 3-methylhydroquinone, 2-methyl-3-ethoxy-5-chlorohydroquinone, pyrogallol, 5-bromopyrogallol, 4,5-dichloropyrogallol, 5,6-dibromopyrogallol, 5-methoxypyrogallol, 5,6-dimethoxypyrogallol, 5-methoxy-6-chloropyrogallol, 5-methylpyrogallol, 4,5-diethylpyrogallol, 5,6-dimethylpyrogallol, phloroglucinol, 4-chlorophloroglucinol, 2,4-dichlorophloroglucinol, 4-methoxyphloroglucinol, 2-methoxy-4-ethoxyphloroglucinol, 2-methoxy-6-chlorophloroglucinol, 2-methylphloroglucinol, 2,6-dimethylphloroglucinol, 2-ethyl-4-n-propylphloroglucinol, hydroxyhydroquinone, 3-chlorohydroxyhydroquinone, 3,5-dibromohydroxyhydroquinone, 3,5-dichlorohydroxyhydroquinone, 3-methoxyhydroxyhydroquinone, 3-methoxy-5-chlorohydroxyhydroquinone, 3-methoxy-5-ethoxyhydroxyhydroquinone, 3-methylhydroxyhydroquinone, 3-methyl-5-ethoxyhyroxyhydroquinone, etc.

The catalytic composition of the present invention comprises a carrier catalyst which is defined in the specification and appended claims to mean "a catalyst which enters into the polymerization while the metallic component undergoes a valence change, but which is regenerated in situ to its original compound existence and oxidation state."

An example of a carrier catalyst in the present invention is palladium acetate which will enter into the polymerization of resorcinol consuming one mole of acetate per mole of resorcinol, however, the palladium acetate will be regenerated in situ to its original compound existence and valence state, that being palladium acetate. The term "carrier catalyst" has also been defined in the description of the well known Wacker reaction, which is the oxidation of ethylene to acetaldehyde in the presence of palladium chloride. Specific examples of palladium carboxylic acid salts include all carboxylic acid salts of palladium possessing between 1 to about 10 carbon atoms such as palladium acetate, palladium propionate, palladium butyrate, palladium isobutyrate, palladium penetanate, palladium heptanate, palladium octanate, palladium nonanate (palladium perlargonate), palladium decanate, etc. In a preferred embodiment of the present invention it is contemplated that the palladium carboxylic acid salt may be prepared in situ by the addition of a palladium salt and an alkali carboxylic acid salt. One example of the in situ preparation of the palladium carboxylic acid salt is the addition of palladium chloride and sodium acetate to an acetic acid medium. Another example is the addition of palladium nitrate and sodium acetate to an acetic acid medium. Regardless of how the carrier catalyst is prepared, it will act as a palladium carboxylic acid salt in the polymerization process of the present invention.

The process is also effected in a medium comprising a carboxylic acid. Examples of suitable carboxylic acids will include all carboxylic acids possessing from about 1 to about 11 carbon atoms such as formic acid, acetic acid, propionic acid, n-butyric acid, isobutyric acid, n-valeric acid, trimethyacetic acid, caproic acid, pelargonic acid, etc. It is understood that the aforementioned dihydroxy benzenes, trihydroxy benzenes, palladium carboxylic acid salts and carboxylic acids are only representative of the class of compounds which may be employed, and that the present invention is not necessarily limited thereto.

The resultant polyphenylene ether polymer of the present invention is defined as a polymer possessing a molecular weight of from about 804 atomic mass units to about 50,000 atomic mass units. The molecular weight range of the polymer product will depend on the polyfunctional phenol which is polymerized in the process of this invention.

The polymerization process of the present invention may be effected in any suitable manner and may comprise a batch or continuous type of operation. For example, when a batch type operation is employed, the polyfunctional phenolic compound is placed in a flask containing a carboxylic acid medium along with a carrier catalyst comprising a palladium carboxylic acid salt. The vessel is heated to a predetermined operating temperature. The vessel is maintained at the desired temperature for a predetermined period of time in the range of from about the reflux temperature of the carboxylic acid to about the boiling point of the polyfunctional phenol to provide the formation of the polyphenylene ether polymer. The polymerization mixture is then recovered and separated from the carrier catalyst and carboxylic acid medium by a conventional means of purification, said means including washing, drying, extraction, evaporation, fractional distillation, etc., whereby the desired polyphenylene ether polymer is recovered. Alternatively, if superatmospheric pressure is to be employed in the polymerization, the polyfunctional phenol is charged to a pressure vessel such as a rotating autoclave which contains a palladium carboxylic acid salt and a carboxylic acid medium. The autoclave is sealed and a substantially inert gas such as nitrogen is forced into the autoclave until the desired pressure is obtained. The autoclave is heated to a predetermined temperature and maintained thereat for the requisite residence time to allow the polymerization of the polyfunctional phenol. The heating is discontinued, the autoclave is allowed to return to room temperature and the excess inert atmosphere is discharged. The autoclave is opened and the polymerization mixture is then treated in a similar manner to that hereinbefore set forth whereby the desired polyphenylene ether polymer is recovered.

It is also contemplated within the scope of this invention that the polymerization process for obtaining the polyphenylene ether polymer may be effected in a continuous manner of operation. When such a type polymerization is employed, the polyfunctional phenol is continuously charged to a polymerization vessel containing a palladium carboxylic acid salt carrier catalyst and a carboxylic acid medium, said polymerization vessel being maintained at the proper operation conditions of pressure and temperature to effect maximum polymerization. After completion of the desired residence time, the polymerization effluent is continuously withdrawn and subjected to conventional means of separation whereby any unpolymerized polyfunctional phenol is recycled to the polymerization vessel and the resultant polyphenylene ether polymer is recovered. Inasmuch as the catalytic composition of matter is solid in nature, various types of continuous operations may be utilized. One such type of operation comprises a fixed bed method in which the carrier catalyst is disposed as a fixed bed in the polymerization zone and the polyfunctional phenol is passed over said fixed bed in either an upward or downward flow.

The following examples are given to illustrate the process of the present invention which, however, are not intended to limit the generally broad scope of the present invention in strict accordance therewith.

EXAMPLE I

In this experiment 5.6 mmoles of hydroquinone is added to a flask containing 25.0 mmoles of palladium acetate in 200 ml of acetic acid. The mixture in the flask is refluxed with the acetic acid for a period of time of about 10 hours while being maintained at 120° C. The product is recovered by means of distillation and filtration and washed with 100 ml of diethyl ether. The resultant polymer is found to be a polyphenylene ether polymer which is self-extinguishing possessing a molecular weight of about 5000 atomic mass units.

EXAMPLE II

In this example 6.5 mmoles of resorcinol was added to a flask containing 11.3 mmoles of palladium chloride and 49 mmoles of sodium acetate in 52 grams of acetic acid. An oil bath was used to heat the flask to 120° C. and maintained thereat for a period of 10 hours. The palladium isolated indicated that the reaction was 91% complete. The polyphenylene ether polymer was recovered from the carrier catalyst and carboxylic acid medium by filtration and analyzed by means of nuclear magnetic resonance, said analysis disclosing the presence of the desired polyphenylene ether polymer.

EXAMPLE III

In this example 12.0 mmoles of catechol is added to a flask containing 25.0 mmoles of palladium butyrate in 250 ml of butyric acid. The flask is equipped with a nitrogen inlet whereby nitrogen is bled into the flask until the desired pressure of 25 atmospheres is obtained and the flask is maintained thereat to afford maximum polymerization at superatmospheric pressure. The polymerization is effected for a period of time comprising 10 hours at a temperature of 150° C. At the end of this time the flask is allowed to return to room temperature and ambient pressure. The resultant polymer is recovered by means of distillation and filtration and washed with 100 ml of diethyl ether. The resultant polymer is found to be a flame retardant polyphenylene ether polymer.

EXAMPLE IV

In this example 12.0 mmoles of hydroxy hydroquinone is added to a flask containing 27.0 mmoles of palladium nitrate, 27.0 mmoles of sodium propionate and 200 ml of propionic acid. The flask is refluxed with 100 ml of additional propionate at the reflux temperature of propionic for a period of time comprising 5 hours. The resultant polymer is recovered by means of distillation and filtration and washed with 100 ml of diethyl ether. The resultant polymer is found to be a self-extinguishing polyphenylene ether polymer.

EXAMPLE V

In this example 12.0 mmoles of resorcinol is added to a flask containing 25.0 mmoles of palladium isobutyrate in 200 ml of isobutyric acid. The flask is equipped with a nitrogen inlet whereby nitrogen is bled into the flask until the desired pressure of 100 atmospheres is obtained and the flask is maintained at a temperature of 110° C. for a period of time comprising 5 hours. At the end of this time the flask is allowed to return to room temperature and ambient pressure. The resultant polymer is recovered by means of distillation and filtration and washed with 100 ml of diethyl ether. The resultant polymer is found to be a flame retardant polyphenylene ether polymer.

EXAMPLE VI

In this example 9.8 mmoles of pyrogallol is added to a flask containing 25.3 mmoles of palladium pelargonate and 200 ml of pelargonic acid. The flask is equipped with a nitrogen inlet whereby nitrogen is bled into the flask until the desired pressure of 50 atmospheres is obtained and the flask is maintained thereat to afford maximum polymerization at superatmospheric pressure. The polymerization is effected for a period of time comprising 10 hours at a temperature of 175° C. At the end of this time the flask is allowed to return to room temperature and ambient pressure. The resultant polymer is recovered by means of distillation and filtration and washed with 100 ml of diethyl ether. The resultant polymer is found to be a flame retardant polyphenylene ether polymer.

We claim as our invention:

1. A process for the preparation of a polymer of a polyphenylene ether which comprises polymerizing a polyfunctional phenol possessing the formula:

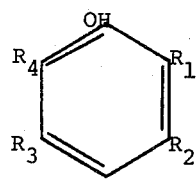 or 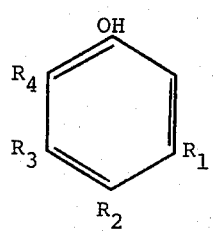

wherein $R_1$, $R_2$, $R_3$ and $R_4$ are selected from the group consisting of hydrogen, alkyl radical possessing between 1 to 3 carbon atoms, lower alkoxy radicals, hydroxy radicals or halogens, but where at least one but not more than two of the radicals comprising $R_1$, $R_2$, $R_3$ or $R_4$ is a hydroxy radical, in the presence of a carrier catalyst comprising a palladium carboxylic acid salt possessing from 1 to 10 carbon atoms in a medium comprising a carboxylic acid possessing 1 to 10 carbon atoms at polymerization conditions of a temperature in the range of from about the reflux temperature of the carboxylic acid medium to about the boiling point of the polyfunctional phenol and recovering the resultant polyphenylene ether polymer.

2. The process of claim 1 further characterized in that the polymerization conditions include a pressure of from about atmospheric to about 100 atmospheres.

3. The process of claim 1 further characterized in that the carrier catalyst comprising a palladium carboxylic acid salt is palladium acetate.

4. The process of claim 1 further characterized in that the carrier catalyst comprising a palladium carboxylic acid salt is palladium butyrate.

5. The process of claim 1 further characterized in that the carier catalyst comprising a palladium carboxylic acid salt is palladium propionate.

6. The process of claim 1 further characterized in that the carrier catalyst comprising a palladium carboxylic acid salt is palladium pelargonate.

7. The process of claim 1 further characteried in that the carrier catalyst comprising a palladium carboxylic acid salt is palladium isobutyrate.

8. The process of claim 1 further characterized in that carrier catalyst comprising a palladium carboxylic acid salt is prepared in situ by means of the addition of a palladium salt and an alkali carboxylic acid salt to the carboxylic acid medium.

9. The process of claim 8 further characterized in that the palladium salt is palladium chloride and the alkali carboxylic acid salt is sodium acetate.

10. The process of claim 8 further characterized in that the palladium salt is palladium nitrate and the alkali carboxylic acid salt is sodium acetate.

11. The process of claim 1 further characterized in that the medium comprising a carboxylic acid is acetic acid.

12. The process of claim 1 further characterized in that the medium comprising a carboxylic acid is butyric acid.

13. The process of claim 1 further characterized in that the medium comprising a carboxylic acid is propionic acid.

14. The process of claim 1 further characterized in that the medium comprising a carboxylic acid is pelargonic acid.

15. The process of claim 1 further characterized in that the medium comprising a carboxylic acid is isobutyric acid.

16. The process of claim 1 further characterized in that the resultant polyphenylene ether polymer possesses a molecular weight of from about 804 atomic mass units to about 50,000 atomic mass units.

17. A process for the preparation of a polymer of a polyphenylene ether which comprises polymerizing resorcinol in the presence of a carrier catalyst comprising a palladium carboxylic acid salt possessing from 1 to 10 carbon atoms in a medium comprising a carboxylic acid possessing 1 to 10 carbon atoms at polymerization conditions of a temperature in the range of from about the reflux temperature of the carboxylic acid medium to about the boiling point of the resorcinol and recovering the resultant polyphenylene ether polymer.

18. A process for the preparation of a polymer of a polyphenylene ether which comprises polymerizing hydroquinone in the presence of a carrier catalyst comprising a palladium carboxylic acid salt possessing from 1 to 10 carbon atoms in a medium comprising a carboxylic acid possessing 1 to 10 carbon atoms at polymerization conditions of a temperature in the range of from about the reflux temperature of the carboxylic acid medium to about the boiling point of the hydroquinone and recovering the resultant polyphenylene ether polymer.

19. A process for the preparation of a polymer of a polyphenylene ether which comprises polymerizing catechol in the presence of a carrier catalyst comprising a palladium carboxylic acid salt possessing from 1 to 10 carbon atoms in a medium comprising a carboxylic acid possessing 1 to 10 carbon atoms at polymerization conditions of a temperature in the range of from about the reflux temperature of the carboxylic acid medium to about the boiling point of the catechol and recovering the resultant polyphenylene ether polymer.

20. A process for the preparation of a polymer of a polyphenylene ether which comprises polymerizing pyrogallol in the presence of a carrier catalyst comprising a palladium carboxylic acid salt possessing from 1 to 10 carbon atoms in a medium comprising a carboxylic acid possessing 1 to 10 carbon atoms at polymerization conditions of a temperature in the range of from about the reflux temperature of the carboxylic acid medium to about the boiling point of the pyrogallol and recovering the resultant polyphenylene ether polymer.

21. A process for the preparation of a polymer of a polyphenylene ether which comprises polymerizing hydroxyhydroquinone in the presence of a carrier catalyst comprising a palladium carboxylic acid salt possessing from 1 to 10 carbon atoms in a medium comprising a carboxylic acid possessing 1 to 10 carbon atoms at polymerization conditions of a temperature in the range of from about the reflux temperature of the carboxylic acid medium to about the boiling point of the hydroxyhydroquinone and recovering the resultant polyphenylene ether polymer.

* * * * *